(12) United States Patent
Cleary et al.

(10) Patent No.: US 10,137,667 B2
(45) Date of Patent: Nov. 27, 2018

(54) GLASS LAMINATE CONSTRUCTION FOR OPTIMIZED BREAKAGE PERFORMANCE

(71) Applicant: CORNING INCORPORATED, Corning, NY (US)

(72) Inventors: Thomas Michael Cleary, Elmira, NY (US); Michael John Moore, Corning, NY (US); Chunhe Zhang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 622 days.

(21) Appl. No.: 14/403,421

(22) PCT Filed: May 31, 2013

(86) PCT No.: PCT/US2013/043561
§ 371 (c)(1),
(2) Date: Nov. 24, 2014

(87) PCT Pub. No.: WO2013/181505
PCT Pub. Date: Dec. 5, 2013

(65) Prior Publication Data
US 2015/0132538 A1 May 14, 2015

Related U.S. Application Data

(60) Provisional application No. 61/654,326, filed on Jun. 1, 2012.

(51) Int. Cl.
*B32B 17/10* (2006.01)

(52) U.S. Cl.
CPC .. *B32B 17/10036* (2013.01); *B32B 17/10137* (2013.01); *B32B 2250/03* (2013.01);
(Continued)

(58) Field of Classification Search
CPC ........ B32B 17/10036; B32B 17/10137; B32B 2605/00; B32B 2419/00; B32B 2250/03;
(Continued)

(56) References Cited

U.S. PATENT DOCUMENTS 3,798,113 A 3/1974 Suzuki et al.
3,801,423 A * 4/1974 Van Laethem ... B32B 17/10018
156/101

(Continued)

FOREIGN PATENT DOCUMENTS

CN 200978253 11/2007
DE 1118626 11/1961

(Continued)

OTHER PUBLICATIONS

Patrick, et al., Safety Performance of a Chemical Strengthened Windshield, *Society of Automotive Engineers, Inc.*, #69048, May 19-23, 1969 (pp. 1-24).

(Continued)

*Primary Examiner* — Laura A Auer
(74) *Attorney, Agent, or Firm* — F. Brock Riggs

(57) ABSTRACT

A glass laminate includes at least one chemically-strengthened glass sheets with a thickness not exceeding 2.0 mm and a polymer interlayer between the glass sheets. Flaws are created in the surface of one of the glass sheets in order to weaken the glass laminate upon an impact event on a first side of the laminate, while retaining the strength of the laminate upon impact on the opposing second side of the laminate. The opposing side of the glass sheet with the flaws or a surface of the other glass sheet may be strengthened with an acid etch treatment in order to further strengthen the laminate upon impact on the opposing second side of the laminate.

18 Claims, 6 Drawing Sheets

(52) U.S. Cl.
CPC ....... *B32B 2250/40* (2013.01); *B32B 2419/00* (2013.01); *B32B 2605/00* (2013.01); *Y10T 428/24355* (2015.01); *Y10T 428/24967* (2015.01)

(58) Field of Classification Search
CPC ......... B32B 2250/40; Y10T 428/24967; Y10T 428/24355
See application file for complete search history.

(56) References Cited

U.S. PATENT DOCUMENTS

| | | | |
|---|---|---|---|
| 4,483,700 | A | 11/1984 | Forker, Jr. et al. |
| 5,456,372 | A * | 10/1995 | Solinov ............. B32B 17/10018 216/34 |
| 5,624,763 | A | 4/1997 | Melancon et al. |
| 5,674,790 | A | 10/1997 | Araujo et al. |
| 6,413,618 | B1 | 7/2002 | Parker et al. ................. 428/195 |
| 6,656,597 | B2 | 12/2003 | Takahara ...................... 428/432 |
| 6,720,082 | B1 | 4/2004 | Hashimoto et al. .......... 428/437 |
| 7,008,898 | B1 | 3/2006 | Alt et al. |
| 7,326,454 | B2 | 2/2008 | Kraemling et al. |
| 7,666,511 | B2 | 2/2010 | Ellison et al. |
| 8,986,072 | B2 | 3/2015 | Darcangelo et al. |
| 2009/0197048 | A1 | 8/2009 | Amin et al. ................... 428/142 |
| 2011/0165393 | A1 | 7/2011 | Bayne et al. |
| 2012/0094084 | A1 | 4/2012 | Fisher et al. |
| 2012/0328843 | A1 | 12/2012 | Cleary et al. |
| 2013/0086948 | A1 | 4/2013 | Bisson et al. |
| 2013/0125589 | A1 | 5/2013 | Dannoux et al. |
| 2013/0125592 | A1 | 5/2013 | Bisson et al. |
| 2013/0127202 | A1 | 5/2013 | Hart |
| 2013/0295357 | A1 | 11/2013 | Cleary et al. |
| 2013/0319046 | A1 | 12/2013 | Cleary et al. |
| 2013/0323415 | A1 | 12/2013 | Brackley et al. |
| 2014/0087159 | A1 | 3/2014 | Cleary et al. |
| 2014/0087193 | A1 | 3/2014 | Cites et al. |
| 2014/0141217 | A1 | 5/2014 | Gulati et al. |
| 2014/0239034 | A1 | 8/2014 | Cleary et al. |
| 2014/0356604 | A1 | 12/2014 | Borrelli et al. |
| 2015/0064374 | A1 | 3/2015 | Jain et al. |
| 2015/0111016 | A1 | 4/2015 | Fisher et al. |
| 2015/0122406 | A1 | 5/2015 | Fisher et al. |
| 2015/0132538 | A1 | 5/2015 | Cleary et al. |
| 2015/0140301 | A1 | 5/2015 | Fisher et al. |
| 2015/0158275 | A1 | 6/2015 | D'Errico et al. |
| 2015/0158277 | A1 | 6/2015 | Fisher et al. |
| 2015/0232366 | A1 | 8/2015 | Fredholm et al. |
| 2015/0232367 | A1 | 8/2015 | Joubaud et al. |
| 2015/0251377 | A1 | 9/2015 | Cleary et al. |
| 2015/0274571 | A1 | 10/2015 | Brennan et al. |
| 2015/0321940 | A1 | 11/2015 | Dannoux et al. |
| 2016/0082705 | A1 | 3/2016 | Fisher et al. |
| 2016/0145139 | A1 | 5/2016 | Fredholm et al. |

FOREIGN PATENT DOCUMENTS

| | | |
|---|---|---|
| DE | 1813267 | 10/1969 |
| DE | 2011634 | 10/1971 |
| DE | 19957317 | 6/2001 |
| DE | 10225555 | 2/2004 |
| DE | 10305733 | 9/2004 |
| GB | 1339980 | 12/1973 |
| JP | 2004264614 A | 9/2010 |
| JP | 05138840 | 2/2013 |
| WO | WO2012/051038 | 4/2012 |
| WO | 2015031148 A1 | 3/2015 |
| WO | 2015031151 A1 | 3/2015 |
| WO | 2015031594 A2 | 3/2015 |
| WO | 2015054112 A1 | 4/2015 |

OTHER PUBLICATIONS

Bergman et al; "Safety Performance of Asymmetric Windshields", SAE paper 780900, 1978.
CN201380040396.6 Office Action dated Nov. 4, 2015.
International Search Report and the Written Opinion of the International Searching Authority; PCT/US2013/043561 dated Aug. 14, 2013.
Chinese Second Office Action and Search Report CN201380040396.6 dated Jul. 1, 2016.
European First Office Action and Search Report EP13728297.6 dated Jun. 30, 2016.
Japanese First Office Action JP2015515225 dated Jun. 3, 2016.
English Translation of CN201380040396.6 Notice of Third Office Action Dispatched dated Dec. 12, 2016; 7 Pages; Chinese Patent Office.

* cited by examiner

High strength glass laminates, with weakening effects on Surface 3
95% CI for the Mean     Laminated with 0.76mm PVB
FLAREed Gorilla glass, 1mm

GLASS LAMINATE CONSTRUCTION FOR OPTIMIZED BREAKAGE PERFORMANCE

CROSS-REFERENCE TO RELATED APPLICATIONS

This application claims the benefit of priority under 35 U.S.C. § 371 of International Application No. PCT/US2013/043561 filed May 31, 2013 which claims the benefit of priority to U.S. Provisional Application No. 61/654,326 filed Jun. 1, 2012 the content of which is relied upon and incorporate herein by reference in its entirety.

FIELD

The present disclosure relates generally to glass laminates, and more particularly to chemically-strengthened glass laminates having low weight, high strength and a specific impact breakage performance.

BACKGROUND

Glass laminates can be used as windows and glazing in architectural and vehicle or transportation applications, including automobiles, rolling stock, locomotive and airplanes. Glass laminates can also be used as glass panels in balustrades and stairs, and as decorative panels or covering for walls, columns, elevator cabs, kitchen appliances and other applications. As used herein, a glazing or a laminated glass structure is a transparent, semi-transparent, translucent or opaque part of a window, panel, wall, enclosure, cover, sign or other structure. Common types of glazing that are used in appliance, architectural and vehicle applications include clear and tinted laminated glass structures.

Conventional automotive glazing constructions may consist of two plies of 2 mm soda lime glass (heat treated or annealed) with a polyvinyl butyral PVB interlayer. These laminate constructions have certain advantages, including, low cost, and a sufficient impact resistance for automotive and other applications. However, because of their limited impact resistance, these laminates usually have a poor behavior and a higher probability of breakage when getting struck by roadside stones, vandals and other impacts.

In many vehicle applications, fuel economy is a function of vehicle weight. It is desirable, therefore, to reduce the weight of glazings for such applications without compromising their strength and sound-attenuating properties. In view of the foregoing, thinner, economical glazings or glass laminates that possess or exceed the durability, sound-damping and breakage performance properties associated with thicker, heavier glazings are desirable.

SUMMARY

In certain applications, it is desirable for glass laminates having a high or maximized impact resistance to impacts on an external side of the laminate (external impacts), in order to resist the impact of stones, hail or vandals, for example, while providing a lower impact resistance an internal side of the glass laminate (internal impacts).

According to one aspect of the present disclosure, two chemically-strengthened glass sheets having a thickness not exceeding 2.0 are laminated together with a polymer interlayer between the two glass sheets to form a glass/PVB/glass laminate. In some embodiments hereof, the glass sheets each have a thickness of about 2.0 mm or less, about 1.5 mm or less, about 1 mm or less, about 0.7 mm or less, in a range from about 0.5 mm to about 1 mm, in a range of from about 5.0 mm to about 0.7 mm, and a near-surface region under a state of compressive stress (CS). The CS at a surface of the two glass sheet can be greater than 300 MPa, and the near surface region can extend from a surface of the glass sheet to a depth of layer (DOL) greater than a value 40 µm. The two glass sheets may each have the same or different CS and DOL, and may be formed with the same or different thicknesses. For example one glass sheet may have a thickness of 1 mm and a CS about 800 MPa and the other glass sheet may have a thickness of 0.7 mm and a CS of about 300 MPa.

According to other aspects hereof, a glass laminate includes an outer glass sheet having a thickness of 2 mm or less, an outer first surface and an inner second surface, an inner glass sheet having a thickness of 2 mm or less, an outer third surface having flaws formed therein to weaken the glass laminated in the event of an internal impact on the fourth surface, an inner fourth surface; a polymer interlayer between the outer glass sheet and the inner glass sheet. At least one or both of the outer glass sheet and the inner glass sheet may be chemically strengthened.

According to another aspect hereof one or both of the second surface and the fourth surface have been acid etched to strengthen the glass laminated in the event of an external impact on the first surface.

In other aspects hereof, the flaws formed in substantially the entire area of the third surface. The flaws may optionally be formed in substantially the entire area of the third surface, except for an outer peripheral portion of the third surface. In another embodiment, the flaws formed in at least one select region of the third surface.

The inner glass sheet and the outer glass sheet may each have a thickness not exceeding 1.5 mm, not exceeding 1.0 mm, or not exceeding 0.7 mm.

The inner glass sheet and the outer glass sheet may each be chemically hardened with a depth of layer (DOL) of about 40 µm.

The inner glass sheet and the outer glass sheet may each be chemically hardened to a surface compressive stress (CS) of at least 300 MPa, at least 500 MPa, at least 700 MPa.

The flaws may be formed in the third surface (i.e. the outer surface of the inner glass sheet) to a depth of about 45 µm. In some embodiments, the depth of the flaws may extend a majority of the way through the DOL. For example, the flaws may extend 80% to 90% the depth of the DOL. Alternatively, the flaws may be formed below the third surface and at a depth of about 75 µm.

In another aspect of the present disclosure the flaws may be formed in the surface of the glass prior to ion exchange. In which case the flaws may be formed to a depth as described above, or may me formed to depth that is two times to three times the DOL.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

Figure 1:
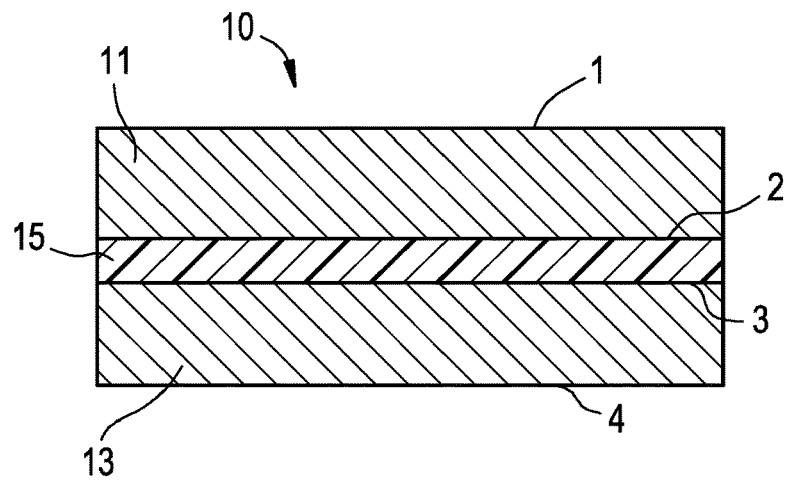
FIG. 1 is a schematic cross-sectional illustration of a portion of a laminated glass structure according to an embodiment hereof.

As schematically illustrated in FIG. 1, glass laminates 10 according to embodiments disclosed herein include one or more thin but high strength glass sheets 11 and 13 and a polymer inter-layer 15, such as polyvinyl butyral (PVB) interlayer. In one embodiment both the outer glass sheet 11 and the inner glass sheet 13 are chemically strengthened thin glass sheets having a thickness of 1.5 mm or less or 1.0 mm or less, for example 0.55 mm, 0.5 mm or 0.7 mm, that have been strengthened via an ion exchange process as described in more detail hereinafter. For example, glass sheets 11 and 13 may both be formed of Corning® Gorilla® glass from Corning Incorporated. As described in U.S. Pat. Nos. 7,666, 511, 4,483,700 and 5,674,790, Corning Gorilla glass is made by fusion drawing a glass sheet and then chemical strengthening the glass sheet. As described in more detail hereinafter, Corning Gorilla glass has a relatively deep depth of layer (DOL) of compressive stress, and presents surfaces having a relatively high flexural strength, scratch resistance and impact resistance. Moving in order from the external surface of the outer glass sheet 11 to the inner glass sheet 12, glass laminates as described herein present a surface 1 (the exterior or outer surface of the laminate 10 and outer glass sheet 11), a surface 2 (the inner surface of the outer glass sheet 11), a surface 3 (the outer facing surface of the inner glass sheet 13), and a surface 4 (the inner facing surface of the inner glass sheet 13).

Terms of orientation, such as "outer," "external" "internal" and "inner" are used in certain embodiments described herein in relation to the inside and outside of a vehicle, device or building, but it will be appreciated that the laminate could be reversed in certain application such that the inner and outer surfaces of the laminate are reversed. As such, these terms as used in the present disclosure and in the appended claims should be interpreted as orienting the layers in the laminate and the surfaces of the layers in relation to each other, rather than in relation the inside or outside of a vehicle, device or structure unless specifically stated otherwise.

According to certain embodiments hereof, the inner surface 2 of the outer glass sheet 11 may be acid etched, as described in more detail hereinafter, in order to reduce the number, size and severity of flaws (not shown) in surface 2 of the outer glass sheet 11. Similarly, in other embodiments hereof, the inner surface 4 of the inner glass sheet 13 may also be acid etched to reduce the number, size and severity of surface flaws. Surface flaws act as fracture sites in the glass sheets. Reducing the number, the size and severity of the flaws in these surfaces removes and minimizes the size of potential fracture initiation sites in these surfaces and thereby strengthens the surface of the glass sheets. In other embodiments hereof, surface 4 is acid etched to remove surface flaws and surface 2 is not acid etched, or surface 2 is acid etched and surface 4 is not acid etched.

Figure 2:
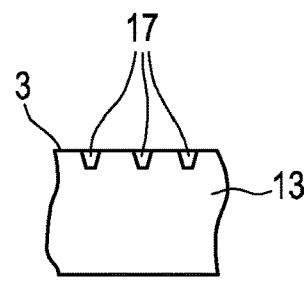
FIG. 2 is a schematic cross-sectional illustration of an embodiment of controlled flaws formed in the outer surface of the inner glass sheet of a glass laminate as illustrated in FIG. 1.
Figure 3:
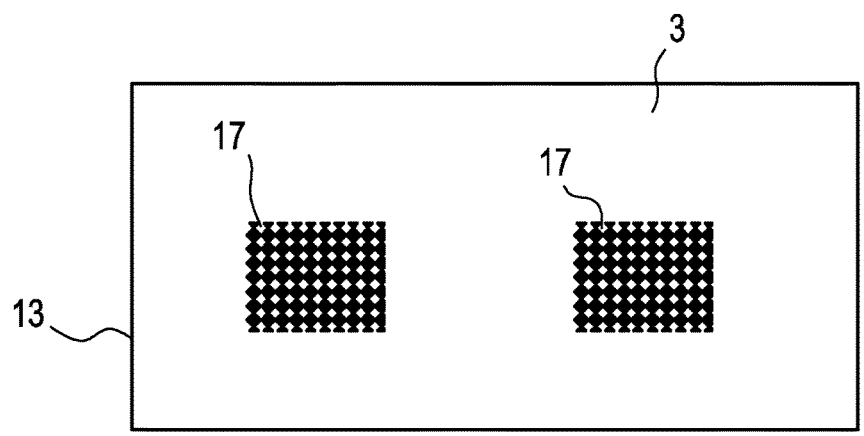
FIG. 3 is a schematic plan view illustration of an inner glass sheet according to an embodiment hereof having controlled flaws as illustrated in FIG. 2 formed in select regions of the outer surface of the inner glass sheet.
Figure 4:
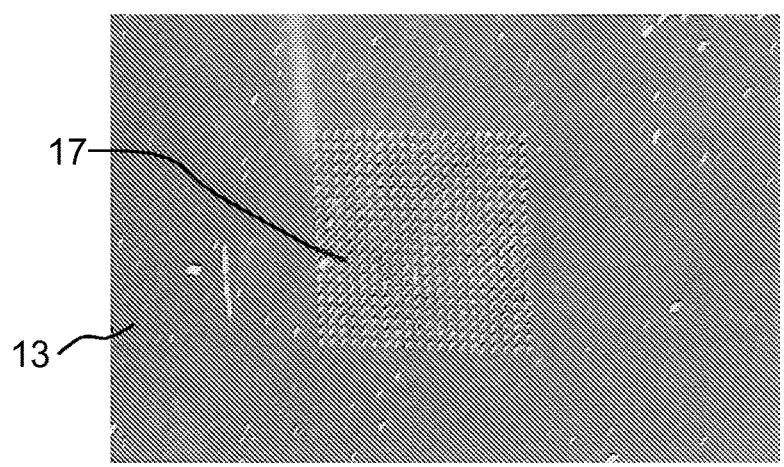
FIG. 4 is a photograph of a plan view of controlled flaws formed in the surface of a glass sheet.

As illustrated in FIGS. 2-5, controlled flaws 17 may be formed in the outer surface 3 of the inner glass sheet 13. Controlled flaws or defects 17 (weakening sources/sites) weaken the resistance of the surface 3 of the inner glass sheet 13 by serving as fracture initiation points. The controlled flaws 17 may be evenly distributed over substantially the entire surface 3 of the inner glass sheet 13 (not shown). The outer periphery of the inner glass sheet may optionally be free of controlled flaws in order to provide relatively strong areas for the mounting of the glass laminate in a desired device (not shown). Alternatively, the controlled flaws 17 may only be distributed over one or more select areas on the outer surface 3 of the inner glass sheet. For example, FIG. 3 is a schematic illustration showing control flaws 17 evenly distributed over two select areas 17 and 19, which areas may correspond to areas in front of a driver and a passenger in a vehicle such as an automobile. In this manner, a glass laminate 10 can be provided that is very robust upon external impact events and has a desired fracture behavior that dissipates energy upon internal impact events. The PVB interlayer holds the fractured glass together, thereby preventing occupants from being sprayed with fractured glass and from being ejected from the vehicle through the fractured glass. In some embodiments hereof, surfaces 1 and 3 are not acid etched, and surface 3 includes controlled flaws 17. In other embodiments hereof, surface 3 includes controlled flaws 17 and surface 4 is acid etched to remove surface flaws and surface 2 is not acid etched; surface 2 is acid etched and surface 4 is not acid etched; or both surfaces 2 and 4 are acid etched.

When the outer surface 1 of a laminate 10 is impacted by an external object such as a stone, hail, foreign road hazard object, or by a blunt object used by a potential car thief or vandal, surfaces 2 and 4 of the laminate go into a state of tension. Therefore, in order to reduce the occurrence of penetration of the impacting object into the vehicle, it is desirable to make surfaces 2 and 4 as strong and resistant to fracture as possible. By acid etching surfaces 2 and 4 of two chemically strengthened tin glass sheets 11 and 13 as described herein, these surfaces can be significantly strengthened by the combined effects of chemical strengthening and acid etching. If etched immediately prior to lamination, the strengthening benefit due to the acid etch on surface 2 that is bonded to the inter-layer may be maintained because this surface is protected from contact and creation of surface flaws by the other glass sheet and the polymer interlayer following lamination. On the other hand, during an internal impact event on the inner surface 4 of a laminate, surfaces 1 and 3 go into tension. The presence of the controlled flaws 17 on the outer surface 3 of the inner glass sheet 13 act as stress concentration sites for the initiation of fractures in the inner glass sheet. Thus, the controlled flaws 17 can ensure that the laminate properly reacts when impacted from the interior of the vehicle by fracturing and absorbing energy at the desired level of impact force or energy.

According to certain embodiments hereof, the controlled flaws 17 formed in the outer surface 3 of the inner glass sheet 13 are micron-level flaws created in surface 3 of the laminate (as shown in FIG. 2). Because many applications require good optical properties, it may be advantageous that these flaws to be invisible to the human eye. The controlled flaws 17 that are invisible to the human eye may be created on surface 3 of the inner glass sheet using, by way of example only, a pico second laser or a femto second laser. A pico second laser is a laser with its optical pulse duration in the domain of picoseconds (1 ps=10−12 s). A femtosecond laser is a laser which emits optical pulses with a duration well below 1 ps, i.e., in the domain of femtoseconds (1 fs= 10−15 s). The controlled flaws (or simply flaws) 17 may be formed in surface 3 using other mechanical means, such as sandblasting or wheel abrading, but these methods may detrimentally effect the optical properties of the laminate 10 and may even create visual damage, which may be acceptable or even serve as a desirable ornamental feature in certain applications. Such visual damage may be effectively hidden by using a PVB interlayer 15 having an index or refraction that substantially matches the index of refraction of the inner glass sheet, or by applying a coating or film to the outer surface 3 of the inner glass sheet that has an index of refraction that substantially matches the index of refraction of the inner glass sheet.

According to certain embodiments hereof, by way of example only, the inner glass sheet 13 is chemically strengthened to have a CS of about 700 MPa to about 750 MPa and a DOL of 40 μm, and the controlled flaws are formed in the outer surface of the inner glass sheer (e.g. the third surface of the laminate). The flaws may have a diameter or width of 20 μm, a depth of 45+/−4 μm and may be spaced apart from each other by a distance of about 2 mm to about 10 mm, or more. In other embodiments hereof, the flaws 17 may be formed in the outer surface of the second glass sheet to a depth of about 30 μm to about 80 μm, and with a width of about 10 μm to about 40 μm.

Figure 5:
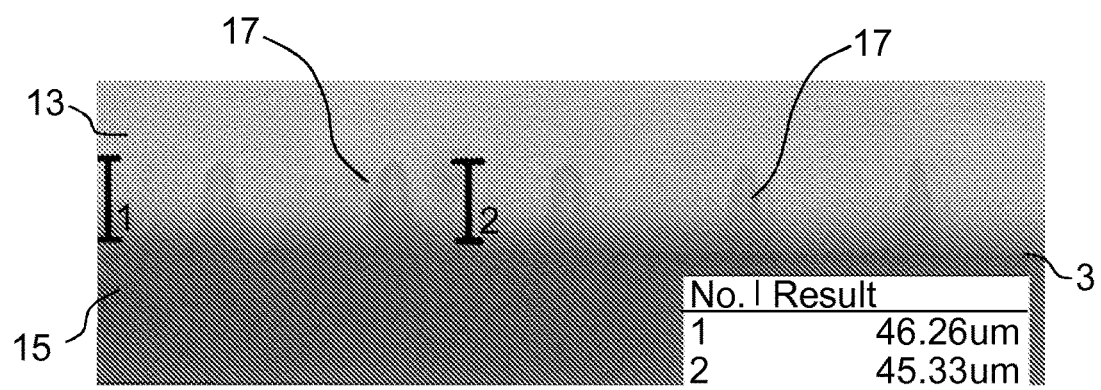
FIG. 5 is a photograph of a cross-section of controlled flaws formed in the surface of a glass sheet.
Figure 6:
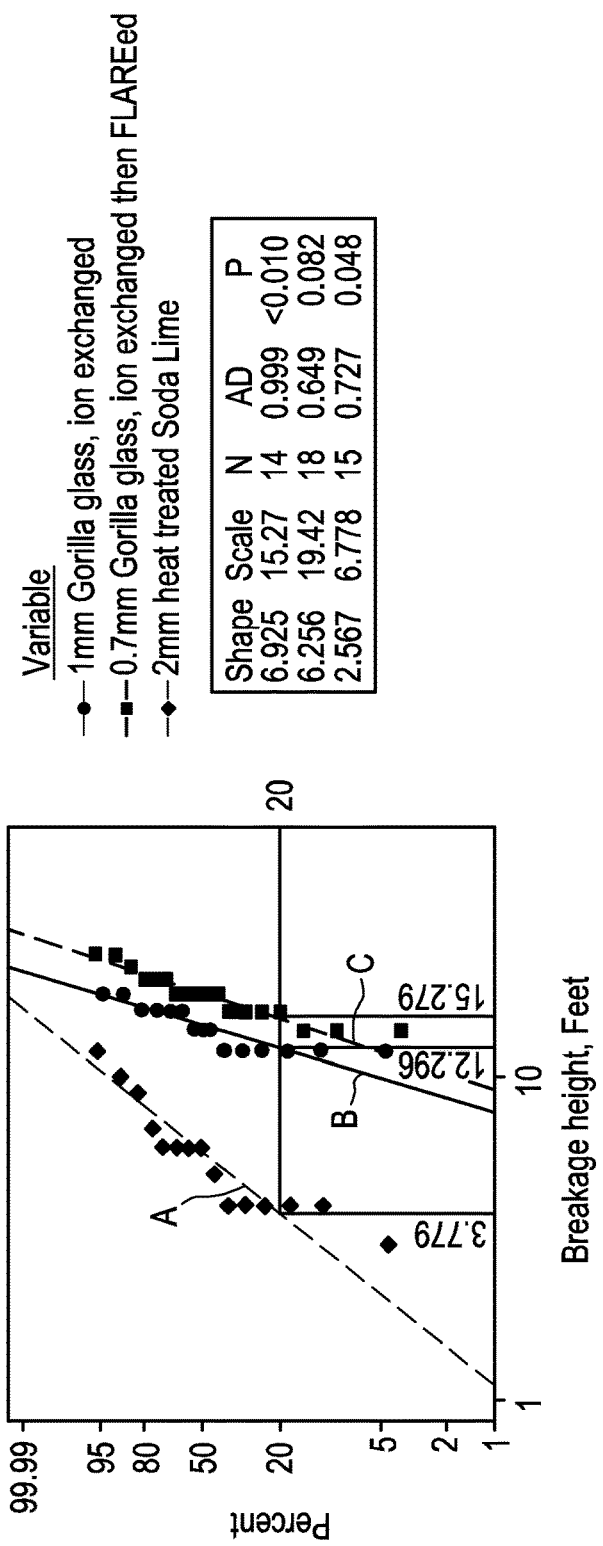
FIG. 6 is a Weibull plot illustrating ball drop height breakage data for chemically strengthened aluminosilicate glass sheets, chemically strengthened and acid etched aluminosilicate glass sheets, and thermally tempered soda lime glass sheets.

It may be disadvantageous for the controlled flaws to completely penetrate the DOL of the compressive stress layer formed in the chemical strengthening process, as this may weaken the glass sheet and the resulting laminate to an unacceptable degree. The controlled flaws may advantageously extend through large portion or majority of the DOL of the compressive stress layer. For example, the controlled flaws may extend about 20% or more, about 30% or more, about 40% or more, about 50% or more, about 60% or more, or about 70% or more, about 80% or more, about 90% or more, or in a range from about 80% to about 90% the depth of the DOL, through the DOL, but less than 100% through the DOL in the glass sheet. FIGS. 5 and 6 are microscopic photographic images in plan view and in cross-section, respectively, of the formed controlled flaws illuminated using special edge lighting to make the flaws visible. The size shape a frequency (spacing) of the flaws 17 will vary depending on the laminate constructions and desired performance of the laminate. For example, thicker glass sheets may require more (more closely spaced), deeper flaws than thinner glass sheets to obtain a desired breakage performance. In any event, the depth and width of the flaws should be small enough that the flaws are not visible. The depth of the flaws and flaw tip geometry is critical to performance of the flaws as weakening fracture initiation sites. The width and length are important around visibility, which very dependent on geometry, how the flaw is created and how the flaw effects the transmitted and reflected light.

In an alternative embodiment of the present disclosure the flaws may be formed in the surface of the glass prior to ion exchange. In which case the flaws may be formed to a depth as described above, or may me formed to depth that is up to two times to three times the DOL, e.g. the depth of the flaws may be about 150%, about 200%, about 250% or about 300% of the DOL.

FIG. 6 is a Weibull plot summarizing ball drop height breakage data for 3 types of laminates upon impact on the external surface 1 of the laminates. The tested glass types included type A (a commercially available automotive windshield laminate formed of two sheets of heat treated 2.0 mm thick soda lime glass), type B (a laminate of two sheets of 1 mm thick Corning® Gorilla™), and type C (a laminate of two sheets of 0.7 mm thick acid etched Corning® Gorilla™ glass). The data was obtained using a standard 0.5 lb. steel ball impact drop test set-up and procedure as specified in ANSIZ26 and ECE R43. The only difference from the standard being that testing was started at a lower height and increased by 1 foot increments until the laminate fractured. This data confirms that the type A soda lime glass laminates have a much lower ball drop breakage height compared to the type B 1 mm Corning® Gorilla™ glass laminates and type C 0.7 mm acid etched Corning® Gorilla™ glass laminates. As shown in FIG. 6, the type B 1 mm ion exchanged Corning® Gorilla™ glass laminates have a much higher ball drop breakage height impact resistance (a demonstrated 20 percentile of about 12.3 feet) than the type A 2 mm heat treated Soda Lime glass laminates (a demonstrated 20 percentile of about 3.8 feet). With the further treatment with acid etching, the type C 0.7 mm ion exchanged and acid etched Corning® Gorilla™ glass laminates demonstrated a 20 percentile of about 15.3 feet ball drop breakage height. The Corning® Gorilla™ glass laminates demonstrate a superior resistance to external impacts.

Small controlled flaws 17 were added to outer surface 3 of the inner glass sheet 13 using a pico laser. A pico laser can be controlled to form flaws that are small enough not to be visible without magnification, yet are large enough to significantly reduce the impact resistance of the laminate 10 to an internal impact. Under normal ambient lighting the flaws are not visible. The invisibility of the controlled flaws to the human eye enables a valuable freedom of location of these flaws (weakening sources) in the final laminate product. In one embodiment, the flaws are advantageously located where the occupants are likely to impact the inner surface of the laminate in the event of a collision. With appropriate adjustments of the laser power, laser pulse duration and power, and speed of the laser scanning passes (or pulse number), controlled flaws 17 can be generated in a size and concentration on surface 3 that produces the required or desired impact resistance or performance. By way of example, a pico laser may be operate at a 532 nm wavelength, ~2.5 W power, with a 80 khz repetition rate for 100 pulses.

Figure 7:
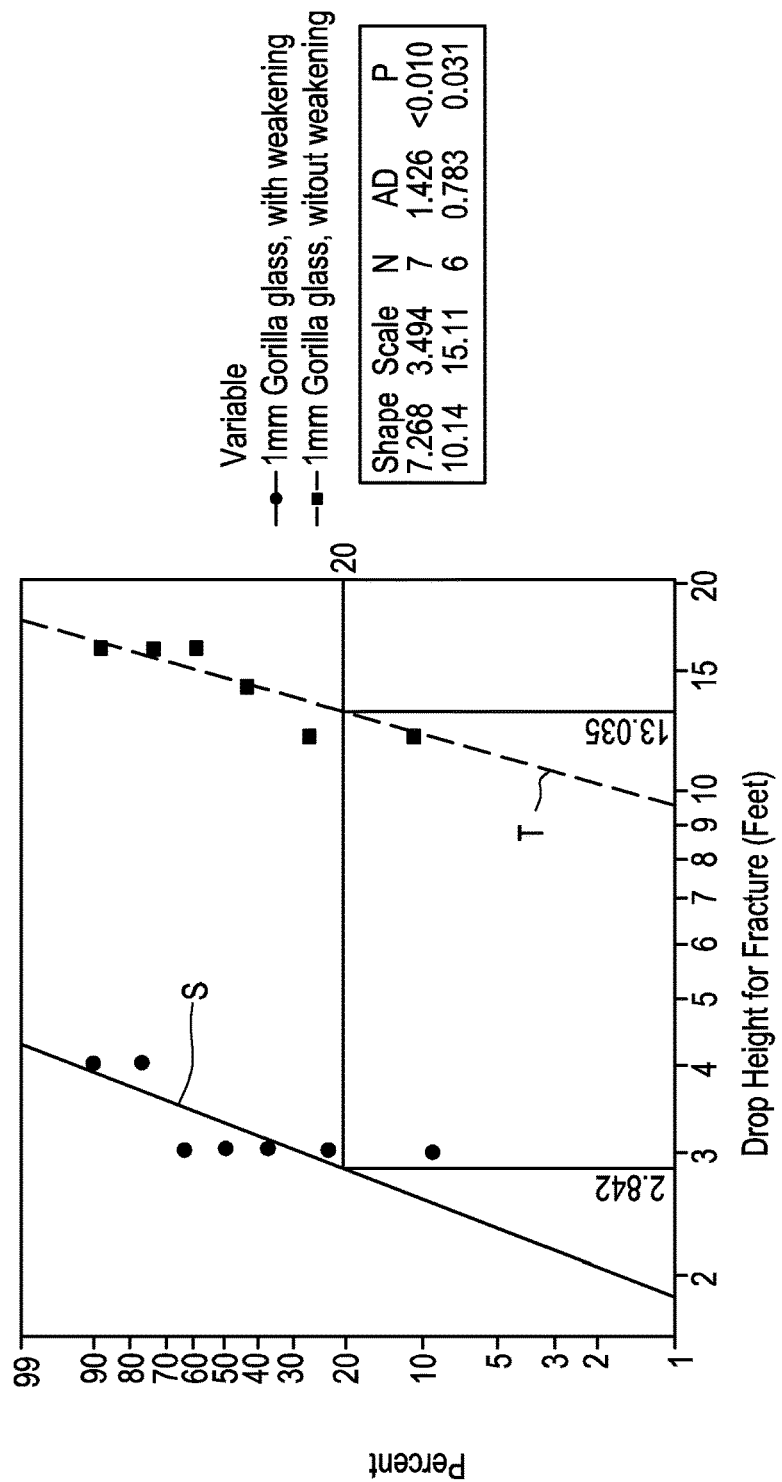
FIG. 7 is a Weibull plot illustrating ball drop height breakage data for glass laminates formed of two chemically strengthened glass sheets with and without controlled flaws formed in the outer surface of the inner glass sheet.

FIG. 7 is a Weibull plot illustrating the ball drop fracture height for impacts on the inner surface 4 of laminates formed of two sheets of 1 mm thick sheets of Corning® Gorilla™ glass. Both laminates S with laser formed controlled flaws in surface 3 of the inner glass sheet 13 and laminates T without laser formed controlled flaws in surface 3 were tested. The tests were again conducted using the standard 0.5 lb. steel ball impact set-up and procedure. As the data shows, for laminate type S with laser machined flaws on surface, the 20th percentile Weibull value is about 2.8 feet ball drop fracture height, which is very close to value the 3.8 feet 20% Weibull value for the incumbent laminate formed of two 2.0 mm heat-strengthened soda lime glass. Laminates type T without laser formed controlled flaws formed in surface 3 demonstrated about a 13.0 feet drop fracture height 20% Weibull value. This data confirms that laminates as described have superior resistance to external impacts (as illustrated by FIG. 6) and acceptable controlled or as-wanted impact/breakage behavior upon internal impacts (as illustrated by FIG. 7) that can meet the requirements of automobile applications.

Figure 8:
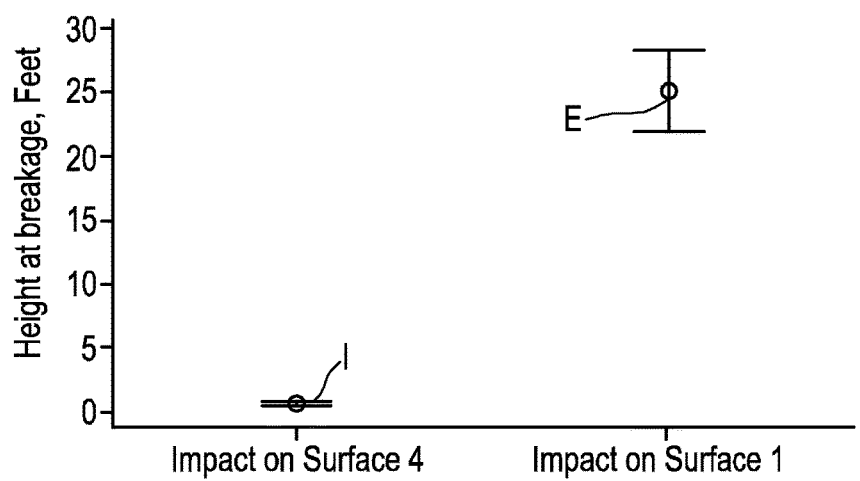
FIG. 8 is interval plot of ball drop breakage height performance of glass laminates formed of two chemically strengthened, acid etched glass sheets with controlled flaws formed on the outer surface of the inner glass sheet upon an internal impact event and upon and external impact event.

As previously described two sheets 1 mm Corning® Gorilla™ glass sheets were etched on one surface and used to form laminates as described herein with acid etched surfaces 2 and 4 and a 0.76 mm PVB interlayer. Controlled flaws 17 were formed in one surface of one of the glass sheets and located on surface 3 of the laminate 10. FIG. 8 is an interval plot of ball drop breakage height performance of such laminates upon an internal impact event I and upon and external impact event E. With the addition of acid etching, these laminates demonstrate even higher drop failure heights when impacted on the outer surface 1 of the laminates and even lower drop failure heights when impacted on the inner surface 4 of the laminates than do laminates that have only been chemically strengthened.

The use of an acid etch surface treatment comprising contacting one surface of a glass sheet with an acidic glass etching medium is relatively versatile, can be readily tailored to most glasses, and can readily applied to both planar and complex cover glass sheet geometries. Further, it is found to be effective to reduce strength variability, even in glass having a low incidence of surface flaws, including up-drawn or down-drawn (e.g., fusion-drawn) glass sheet that is conventionally thought to be largely free of surface flaws introduced during manufacture or during post-manufacturing processing. The acid treatment step is thought to provide a chemical polishing of the surface that may alter the size and/or geometry of surface flaws and or reduce the size and number of surface flaws, which size, number and shape variables are thought to play an important role in the strength of the glass sheets, but have a minimal effect on the general topography of the treated surface. In general, acid etching treatments effective to remove not more than about 4 μm of surface glass, or in some embodiments not more than 2 μm, or even not more than 1 μm, may be employed for the described purpose. The acid etch treat may be advantageously performed as immediately prior to lamination as possible, so that the inner surface (#2) surface is protected from creation of any news flaws.

The acid removal of more than the prescribed thicknesses of surface glass from chemically tempered glass sheet is to be avoided for at least two reasons. First, excessive removal reduces both the thickness of the surface compression layer and the level of surface compressive stress provided by that layer. Both effects are detrimental to the impact and flexural damage resistance of the sheet. Secondly, excessive etching of the glass surface can increase the level of surface haze in the glass to objectionable levels. For window, automotive glazing, and consumer electronics display applications, typically no or very limited visually detectable surface haze in the glass cover sheet for the display is permitted.

A variety of etchant chemicals, concentrations, and treatment times may be used to achieve a selected level of surface treatment and strengthening. Examples of chemicals useful for carrying out the acid treatment step including fluoride-containing aqueous treating media containing at least one active glass etching compound selected from the group consisting of HF, combinations of HF with one or more of HCL, $HNO_3$ and $H_2SO_4$, ammonium bifluoride, sodium bifluoride and others. As one particular example, an aqueous acidic solution consisting of 5 vol. % HF (48%) and 5 vol. % $H_2SO_4$ (98%) in water will significantly improve the ball drop performance of ion-exchange-strengthened alkali aluminosilicate glass sheet having a thickness in the range of 0.5-1.5 mm using treatment times as short as one minute in duration. Best results with acidic etching media of $HF/H_2SO_4$ composition are obtained with drawn sheet glass previously strengthened using a chemical (ion-exchange) tempering treatment. Glass not subjected to ion-exchange strengthening or thermal tempering, whether before or after acid etching, may require different combinations of etching media to achieve large improvements in ball drop test results.

Maintaining adequate control over the thickness of the glass layer removed by etching in HF-containing solutions is facilitated if the concentrations of HF and dissolved glass constituents in the solutions are closely controlled. While periodic replacement of the entire etching bath to restore acceptable etching rates is effective for this purpose, bath replacement is expensive and the cost of effectively treating and disposing of depleted etching solutions is high. In accordance with the present disclosure a method for continually refreshing an HF etching bath that contains an excessive amount of dissolved glass or an insufficient concentration of HF may be employed. In accordance with that method a volume of the bath containing known concentrations of dissolved glass constituents and HF, wherein the HF concentration is below a predetermined minimum and/or the mass of dissolved glass is above a predetermined maximum, is removed from the bath. The removed volume is then replaced by an equivalent volume of an HF-containing solution containing HF in a concentration sufficient to restore the HF concentration of the bath to at least the predetermined minimum HF concentration. In typical embodiments the replacement solution will also be substantially free of dissolved glass constituents.

The disclosed bath replacement may be practiced in stepwise or in substantially continuous fashion, as dictated by the particular glass sheet finishing plan to be employed. However, if practiced in stepwise fashion, the steps of removal and replacement are carried out with a frequency sufficient to maintain the HF concentration at or above the predetermined minimum and the mass of dissolved glass constituents at or below a predetermined maximum. The minimum HF and maximum dissolved glass levels are predetermined from those levels found to unacceptably reduce surface glass dissolution rates by the bath. The concentrations of HF and dissolved glass in the bath at any selected time can be measured, or they can be calculated given knowledge of the etching conditions, dissolved glass compositions, and surface areas of the glass sheets being treated.

The flexural strengths of a thin tempered and acid-etched glass sheet is significantly influenced by the surface quality of the starting glass sheet as a whole, particularly including the size and spatial distribution of any surface flaws present on the sheet prior to treatment. This source of sheet failure is not readily apparent from ball drop impact testing because the sheet surface areas stressed under ball drop impacts are much smaller than those stressed during bi-axial or four-point bend testing. To insure consistently high strengths in thin glass sheet glass subjected to chemical tempering and acid etching in accordance with the presently disclosed methods, a preliminary step of selecting sheets for treatment that are substantially free of surface flaws of a depth greater than 2 μm prior to treatment may be advantageous. Such sheets can consistently provide high flexural strengths even where etching treatments designed to remove only minimum surface thicknesses from the tempered sheets are required.

The method by which glass sheet surfaces absent surface flaws of depths above 2 μm are provided, however, is not critical. Strength screening, the use of mechanical pre-finishing (via grinding and polishing), or the use of sheet with fusion-formed surfaces that has been carefully protected from post-manufacturing handling damage, can each provide glass with the requisite freedom from large surface flaws. However, higher levels of strength enhancement are generally provided where the presently disclosed methods are applied to glass sheet glass with fusion drawn surfaces.

Satisfactorily strengthened glass cover sheets of the described composition and thickness for these applications retain a compressive surface layer having a DOL of at least 30 μm or even 40 μm, after surface etching, with the surface layer providing a peak compressive stress level of at least 500 MPa, or even 650 MPa. To provide thin alkali aluminosilicate glass sheets offering this combination of properties, sheet surface etching treatments of limited duration are required. In particular, the step of contacting a surface of the glass sheet with an etching medium is carried out for a period of time not exceeding that required for effective to remove 2 μm of surface glass, or in some embodiments not exceeding that effective to remove 1 μm of surface glass. The actual etching time required to limit glass removal in any particular case will depend on the composition and temperature of the etching medium as well as the composition of the solution and the glass being treated, but treatments effective to remove not more than 1 μm or 2 μm of glass from the surface of a selected glass sheet can readily be determined by routine experiment.

An alternative method for insuring that glass sheet strengths and surface compression layer depths are adequate involves tracking reductions in surface compressive stress level as etching proceeds. Etching time is then limited to limit the reductions in surface compressive stress necessarily caused by the etching treatment. Thus, in some embodiments the step of contacting a surface of a strengthened alkali aluminosilicate glass sheet with an etching medium is carried out for a time not exceeding a time effective to reduce the compressive stress level in the glass sheet surface by 3% or other acceptable amount. Again the period of time suitable for achieving that result will depend on the composition and temperature of the etching medium as well as the composition of the glass sheet, but can readily be determined by routine experiment.

As noted above, the particular etching procedure used to treat the surface of a tempered glass sheet is not critical, but will depend on the particular etching medium employed as well as the particular requirements of the cover glass application. A more detailed description of such a glass surface acid or etching treatment can be found in commonly owned Published U.S. Patent Application No. 2011/0165393A1 entitled Impact-Resistant Glass Sheet filed on Jan. 7, 2011, the disclosure of which is hereby incorporated herein as of reference.

According to certain embodiments hereof the desired strength/breakage performance of the laminate may be achieved or controlled by controlling how deep the flaws are formed in the glass. The flaws may be created on/in the surface of the glass sheet or internally in the glass sheet, i.e., leaving the glass surface of the sheet undamaged by the laser. For example, the strength of the laminate can be selected by controlling the depth of the controlled flaws in or below the surface 3. Flexural strength data was generated using 0.5 mm Corning Eagle XG™ (annealed) monolayer samples with controlled flaws at different locations (distances from the surface 3). In the test, about 80 μm deep flaws were added on the surface of the Corning Eagle XG™ (annealed) monolayer samples, and at depths of 0 μm, 25 μm, 75 μm, 150 μm below the surface of the glass sheet. These results demonstrated observable dependency of the flexural strength on the depth of the flaws below the surface of the glass sheet.

As previously described, suitable glass sheets may be chemically strengthened by an ion exchange process. In this process, typically by immersion of the glass sheet into a molten salt bath for a predetermined period of time, ions within the glass sheet at or near the surface of the glass sheet are exchanged for larger metal ions, for example, from the salt bath. In one embodiment, the temperature of the molten salt bath is about 430° C. and the predetermined time period is about eight hours. The incorporation of the larger ions into the glass strengthens the sheet by creating a compressive stress in a near surface region. A corresponding tensile stress is induced within a central region of the glass sheet to balance the compressive stress.

Example ion-exchangeable glasses that are suitable for forming glass laminates are alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size.

One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass sheets include at least 6 wt. % aluminum oxide. In a further embodiment, a glass sheet includes one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for forming glass laminates comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %≤($Li_2O+Na_2O+K_2O$)≤18 mol. % and 2 mol. %≤(MgO+CaO)≤7 mol. %.

In a particular embodiment, an alkali aluminosilicate glass comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum modifiers} > 1,$$

wherein the ratio the components are expressed in mol. % and the modifiers are selected from alkali metal oxides. This glass, in particular embodiments, comprises, consists essentially of, or consists of: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum modifiers} > 1.$$

In another embodiment, an alkali aluminosilicate glass comprises, consists essentially of, or consists of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

In yet another embodiment, an alkali aluminosilicate glass substrate comprises, consists essentially of, or consists of: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; wherein 12 mol. %≤$Li_2O$+$Na_2O$+$K_2O$≤20 mol. % and 0 mol. %≤MgO+CaO≤10 mol. %.

In still another embodiment, an alkali aluminosilicate glass comprises, consists essentially of, or consists of: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2$+$B_2O_3$+CaO≤69 mol. %; $Na_2O$+$K_2O$+$B_2O_3$+MgO+CaO+SrO>10 mol. %; 5 mol. %≤MgO+CaO+SrO≤8 mol. %; ($Na_2O$+$B_2O_3$)−$Al_2O_3$≤2 mol. %; 2 mol. %≤$Na_2O$−$Al_2O_3$≤6 mol. %; and 4 mol. %≤($Na_2O$+$K_2O$)−$Al_2O_3$≤10 mol. %.

The glass, in some embodiments, is batched with 0-2 mol. % of at least one fining agent selected from a group that includes $Na_2SO_4$, NaCl, NaF, NaBr, $K_2SO_4$, KCl, KF, KBr, and $SnO_2$.

In one example embodiment, sodium ions in the glass can be replaced by potassium ions from the molten bath, though other alkali metal ions having a larger atomic radius, such as rubidium or cesium, can replace smaller alkali metal ions in the glass. According to particular embodiments, smaller alkali metal ions in the glass can be replaced by $Ag^+$ ions. Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass that results in a stress profile. The larger volume of the incoming ion produces a compressive stress (CS) on the surface and tension (central tension, or CT) in the center region of the glass. The compressive stress is related to the central tension by the following relationship:

$$CS = CT\left(\frac{t - 2DOL}{DOL}\right)$$

where t is the total thickness of the glass sheet and DOL is the depth of exchange, also referred to as depth of layer.

According to various embodiments, thin glass laminates comprising one or more sheets of ion-exchanged glass and having a specified depth of layer versus compressive stress profile possess an array of desired properties, including low weight, high impact resistance, and improved sound attenuation.

In one embodiment, a chemically-strengthened glass sheet can have a surface compressive stress of at least 300 MPa, e.g., at least 400 MPa, at least 500 MPa, at least 600 MPa, or at least 700 MPa, a depth of at least about 20 μm (e.g., at least about 20, 25, 30, 35, 40, 45, or 50 μm) and/or a central tension greater than 40 MPa (e.g., greater than 40, 45, or 50 MPa) and less than 100 MPa (e.g., less than 100, 95, 90, 85, 80, 75, 70, 65, 60, or 55 MPa).

Figure 9:
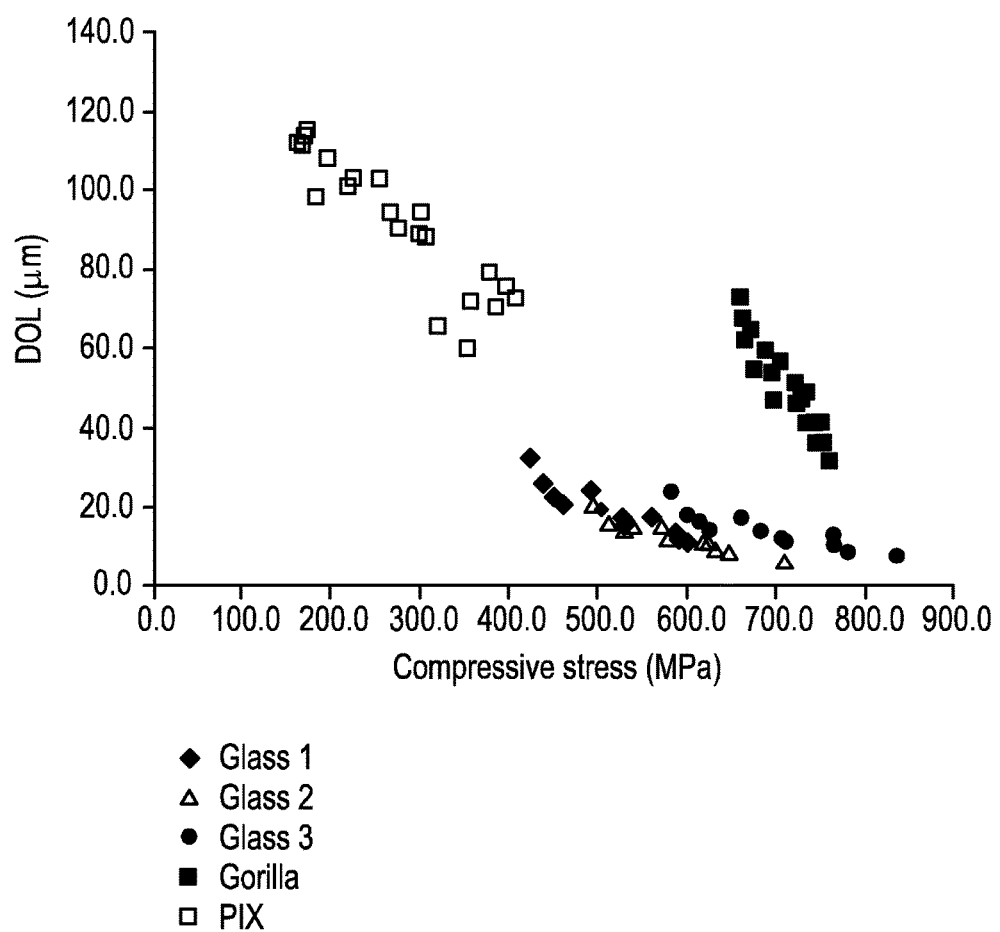
FIG. 9 is a plot that compare the surface compressive stress and depth of layer of chemically strengthened soda lime glass with chemically strengthened aluminosilicate glass according to an embodiment hereof.

An example embodiment is illustrated in FIG. 9, which shows a depth of layer versus compressive stress plot for various glass sheets. Data from a comparative soda lime glass are designated by diamonds "SL" while data from chemically-strengthened aluminosilicate glasses are designated by triangles "GG." As shown in the illustrated embodiment, the depth of layer versus surface compressive stress data for the chemically-strengthened sheets can be defined by a compressive stress of greater than about 600 MPa, and a depth of layer greater than about 20 micrometers. A region 200 is defined by a surface compressive stress greater than about 600 MPa, a depth of layer greater than about 40 micrometers, and a tensile stress between about 40 and 65 MPa.

Independently of, or in conjunction with, the foregoing relationships, the chemically-strengthened glass can have depth of layer that is expressed in terms of the corresponding surface compressive stress. In one example, the near surface region extends from a surface of the first glass sheet to a depth of layer (in micrometers) of at least 65-0.06(CS), where CS is the surface compressive stress and has a value of at least 300 MPa. This linear relationship is pictured in FIG. 9, the illustrated that satisfactory CS and DOL levels located above the line 65-0.06(CS) on a plot of DOL on the y-axis and CS on the x-axis.

In a further example, the near surface region extends from a surface of the first glass sheet to a depth of layer (in micrometers) having a value of at least B-M(CS), where CS is the surface compressive stress and is at least 300 MPa. In the foregoing expression, B can range from about 50 to 180 (e.g., 60, 70, 80, 90, 100, 110, 120, 130, 140, 150, 160±5), and M can range independently from about −0.2 to −0.02 (e.g., −0.18, −0.16, −0.14, −0.12, −0.10, −0.08, −0.06, −0.04±−0.01).

A modulus of elasticity of a chemically-strengthened glass sheet can range from about 60 GPa to 85 GPa (e.g., 60, 65, 70, 75, 80 or 85 GPa). The modulus of elasticity of the glass sheet(s) and the polymer interlayer can affect both the mechanical properties (e.g., deflection and strength) and the acoustic performance (e.g., transmission loss) of the resulting glass laminate.

Example glass sheet forming methods include fusion draw and slot draw processes, which are each examples of a down-draw process, as well as float processes. The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, because the two glass films flowing over the channel fuse together, neither outside surface of the resulting glass sheet comes in contact with any part of the apparatus. Thus, the surface properties of the fusion drawn glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet and into an annealing region. The slot draw process can provide a thinner sheet than the fusion draw process because only a single sheet is drawn through the slot, rather than two sheets being fused together.

Down-draw processes produce glass sheets having a uniform thickness that possess surfaces that are relatively pristine. Because the strength of the glass surface is controlled by the amount and size of surface flaws, a pristine surface that has had minimal contact has a higher initial strength. When this high strength glass is then chemically strengthened, the resultant strength can be higher than that of a surface that has been a lapped and polished. Down-drawn glass may be drawn to a thickness of less than about 2 mm. In addition, down drawn glass has a very flat, smooth surface that can be used in its final application without costly grinding and polishing.

In the float glass method, a sheet of glass that may be characterized by smooth surfaces and uniform thickness is made by floating molten glass on a bed of molten metal, typically tin. In an example process, molten glass that is fed onto the surface of the molten tin bed forms a floating ribbon. As the glass ribbon flows along the tin bath, the temperature is gradually decreased until a solid glass sheet can be lifted from the tin onto rollers. Once off the bath, the glass sheet can be cooled further and annealed to reduce internal stress.

Glass laminates for automotive glazing and other applications can be formed using a variety of processes. In an example process, one or more sheets of chemically-strengthened glass sheets are assembled in a pre-press with a polymer interlayer, tacked into a pre-laminate, and finished into an optically clear glass laminate. The assembly, in an example embodiment that comprises two glass sheets, involves laying down a first sheet of glass, overlaying a polymer interlayer such as a PVB sheet, laying down a second sheet of glass, and then trimming the excess PVB to the edges of the glass sheets. The tacking step can include expelling most of the air from the interfaces and partially bonding the PVB to the glass sheets. The finishing step, typically carried out at elevated temperature and pressure, completes the mating of each of the glass sheets to the polymer interlayer.

A thermoplastic material such as PVB may be applied as a preformed polymer interlayer. The thermoplastic layer can, in certain embodiments, have a thickness of at least 0.125 mm (e.g., 0.125, 0.25, 0.375, 0.5, 0.75, 0.76 or 1 mm). The thermoplastic layer can cover most or, preferably, substantially all of the two opposed major faces of the glass. It may also cover the edge faces of the glass. The glass sheet(s) in contact with the thermoplastics layer may be heated above the softening point of the thermoplastic, such as, for example, at least 5° C. or 10° C. above the softening point, to promote bonding of the thermoplastic material to the glass. The heating can be performed with the glass ply in contact with the thermoplastic layers under pressure.

Select commercially available polymer interlayer materials are summarized in Table 1, which provides also the glass transition temperature and modulus for each product sample. Glass transition temperature and modulus data were determined from technical data sheets available from the vendor or using a DSC 200 Differential Scanning Calorimeter (Seiko Instruments Corp., Japan) or by ASTM D638 method for the glass transition and modulus data, respectively. A further description of the acrylic/silicone resin materials used in the ISD resin is disclosed in U.S. Pat. No. 5,624,763, and a description of the acoustic modified PVB resin is disclosed in Japanese Patent No. 05138840, the entire contents of which are hereby incorporated by reference in their entirety.

TABLE 1

Example Polymer Interlayer Materials

| Interlayer Material | $T_g$ (° C.) | Modulus, psi (MPa) |
|---|---|---|
| EVA (STR Corp., Enfield, CT) | −20 | 750-900 (5.2-6.2) |
| EMA (Exxon Chemical Co., Baytown, TX) | −55 | <4,500 (27.6) |
| EMAC (Chevron Corp., Orange, TX) | −57 | <5,000 (34.5) |
| PVC plasticized (Geon Company, Avon Lake, OH) | −45 | <1500 (10.3) |
| PVB plasticized (Solutia, St. Louis, MO) | 0 | <5000 (34.5) |
| Polyethylene, Metallocene-catalyzed (Exxon Chemical Co., Baytown, TX) | −60 | <11,000 (75.9) |
| Polyurethane Hard (97 Shore A) | 31 | 400 |
| Polyurethane Semi-rigid (78 Shore A) | −49 | 54 |
| ISD resin (3M Corp., Minneapolis, MN) | −20 | |
| Acoustic modified PVB (Sekisui KKK, Osaka, Japan) | | 140 |
| Uvekol A (liquid curable resins) (Cytec, Woodland Park, NJ) | | |

A modulus of elasticity of the polymer interlayer can range from about 1 MPa to 75 MPa (e.g., about 1, 2, 5, 10, 15, 20, 25, 50 or 75 MPa). At a loading rate of 1 Hz, a modulus of elasticity of a standard PVB interlayer can be about 15 MPa, and a modulus of elasticity of an acoustic grade PVB interlayer can be about 2 MPa.

One or more polymer interlayers may be incorporated into a glass laminate. A plurality of interlayers may provide complimentary or distinct functionality, including adhesion promotion, acoustic control, UV transmission control, and/or IR transmission control.

During the lamination process, the interlayer is typically heated to a temperature effective to soften the interlayer, which promotes a conformal mating of the interlayer to respective surfaces of the glass sheets. For PVB, a lamination temperature can be about 140° C. Mobile polymer chains within the interlayer material develop bonds with the glass surfaces, which promote adhesion. Elevated temperatures also accelerate the diffusion of residual air and/or moisture from the glass-polymer interface.

The optional application of pressure both promotes flow of the interlayer material, and suppresses bubble formation that otherwise could be induced by the combined vapor pressure of water and air trapped at the interfaces. To suppress bubble formation, heat and pressure can be simultaneously applied to the assembly in an autoclave.

Glass laminates can be formed using substantially identical glass sheets or, in alternate embodiments, characteristics of the individual glass sheets such as composition, ion exchange profile and/or thickness can be independently varied to form an asymmetric glass laminate.

Glass laminates can be used to provide beneficial effects, including the attenuation of acoustic noise, reduction of UV and/or IR light transmission, and/or enhancement of the aesthetic appeal of a window opening. The individual glass sheets comprising the disclosed glass laminates, as well as the formed laminates, can be characterized by one or more attributes, including composition, density, thickness, surface metrology, as well as various properties including mechanical, optical, and sound-attenuation properties. Various aspects of the disclosed glass laminates are described herein.

The weight savings associated with using thinner glass sheets can be seen with reference to Table 2, which shows the glass weight, interlayer weight, and glass laminate weight for exemplary glass laminates having a real dimension of 110 cm×50 cm and a polymer interlayer comprising a 0.76 mm thick sheet of PVB having a density of 1.069 $g/cm^3$.

TABLE 2

Physical properties of glass sheet/PVB/glass sheet laminate.

| Thickness (mm) | Glass Weight (g) | PVB weight (g) | Laminate weight (g) |
|---|---|---|---|
| 4 | 5479 | 445 | 11404 |
| 3 | 4110 | 445 | 8664 |
| 2 | 2740 | 445 | 5925 |
| 1.4 | 1918 | 445 | 4281 |
| 1 | 1370 | 445 | 3185 |
| 0.7 | 959 | 445 | 2363 |
| 0.5 | 685 | 445 | 1815 |

As can be seen with reference to Table 2, by decreasing the thickness of the individual glass sheets, the total weight of the laminate can be dramatically reduced. In some applications, a lower total weight translates directly to greater fuel economy.

The glass laminates can be adapted for use, for example, as windows or glazings, and configured to any suitable size and dimension. In embodiments, the glass laminates have a length and width that independently vary from 10 cm to 1 m or more (e.g., 0.1, 0.2, 0.5, 1, 2, or 5 m). Independently, the glass laminates can have an area of greater than 0.1 $m^2$, e.g., greater than 0.1, 0.2, 0.5, 1, 2, 5, 10, or 25 $m^2$.

The glass laminates can be substantially flat or shaped for certain applications. For instance, the glass laminates can be formed as bent or shaped parts for use as windshields or cover plates. The structure of a shaped glass laminate may be simple or complex. In certain embodiments, a shaped glass laminate may have a complex curvature where the glass sheets have a distinct radius of curvature in two independent directions. Such shaped glass sheets may thus be characterized as having "cross curvature," where the glass is curved along an axis that is parallel to a given dimension and also curved along an axis that is perpendicular to the same dimension. An automobile sunroof, for example, typically measures about 0.5 m by 1.0 m and has a radius of curvature of 2 to 2.5 m along the minor axis, and a radius of curvature of 4 to 5 m along the major axis.

Shaped glass laminates according to certain embodiments can be defined by a bend factor, where the bend factor for a given part is equal to the radius of curvature along a given axis divided by the length of that axis. Thus, for the example automotive sunroof having radii of curvature of 2 m and 4 m along respective axes of 0.5 m and 1.0 m, the bend factor along each axis is 4. Shaped glass laminates can have a bend factor ranging from 2 to 8 (e.g., 2, 3, 4, 5, 6, 7, or 8).

Methods for bending and/or shaping glass laminates can include gravity bending, press bending and methods that are hybrids thereof. In a traditional method of gravity bending thin, flat sheets of glass into curved shapes such as automobile windshields, cold, pre-cut single or multiple glass sheets are placed onto the rigid, pre-shaped, peripheral support surface of a bending fixture. The bending fixture may be made using a metal or a refractory material. In an example method, an articulating bending fixture may be used. Prior to bending, the glass typically is supported only at a few contact points. The glass is heated, usually by exposure to elevated temperatures in a lehr, which softens the glass allowing gravity to sag or slump the glass into conformance with the peripheral support surface. Substantially the entire support surface generally will then be in contact with the periphery of the glass.

A related technique is press bending where flat glass sheets are heated to a temperature corresponding substantially to the softening point of the glass. The heated sheets are then pressed or shaped to a desired curvature between male and female mold members having complementary shaping surfaces. In embodiments, a combination of gravity bending and press bending techniques can be used.

A total thickness of the glass laminate can range from about 2 mm to 4 mm, where the individual glass sheets (e.g., one or more chemically-strengthened glass sheets) can have a thickness of from 0.5 to 2 mm (e.g., 0.1, 0.2, 0.3, 0.5, 0.7, 1, 1.4, 1.7, or 2 mm). In embodiments, a chemically-strengthened glass sheet can have a thickness of less than 1.4 mm or less than 1.0 mm. In further embodiments, a thickness of a chemically-strengthened glass sheet can be substantially equal to a thickness of a second glass sheet, such that the respective thicknesses vary by no more than 5%, e.g., less than 5, 4, 3, 2 or 1%. According to embodiments, the second (e.g., inner) glass sheet can have a thickness less than 2.0 mm (e.g., less than 1.4 mm). Without wishing to be bound by theory, Applicants believe that a glass laminate comprising opposing glass sheets having substantially identical thicknesses can provide a maximum coincidence frequency and corresponding maximum in the acoustic transmission loss at the coincidence dip. Such a design can provide beneficial acoustic performance for the glass laminate, for example, in automotive applications.

Example glass laminate structures are illustrated in Table 3, where the abbreviation GG refers to a chemically-strengthened aluminosilicate glass sheet, and the term "soda lime" refers to a non-chemically-strengthened soda lime glass sheet. As used herein, the abbreviations "SP," "S-PVB" or simply "PVB" may be used for standard grade PVB. The abbreviations "AP" or "A-PVB" are used for acoustic grade PVB.

TABLE 3

Example glass laminate structures

| Sample | Configuration |
|---|---|
| 1 | 2 mm soda lime/0.76 mm PVB/2 mm soda lime (comparative example) |
| 2 | 2 mm GG/0.76 mm PVB/2 mm GG |
| 3 | 1.4 mm GG/0.76 mm PVB/1.4 mm GG |
| 4 | 1 mm GG/0.76 mm PVB/1 mm GG |
| 5 | 1 mm GG/0.81 mm acoustic PVB/1 mm GG |
| 6 | 0.7 mm GG/0.76 mm PVB/0.7 mm GG |
| 7 | 0.7 mm GG/0.38 mm PVB/0.7 mm GG |
| 8 | 0.7 mm GG/1.143 mm PVB/0.7 mm GG |
| 9 | 1 mm GG/0.76 mm PVB/0.7 mm GG/0.76 mm PVB/1 mm GG |
| 10 | 1 mm GG/0.76 mm PVB/0.7 mm soda lime/0.76 mm PVB/1 mm GG |

Applicants have shown that the glass laminate structures disclosed herein have excellent durability, impact resistance, toughness, and scratch resistance. As is well known among skilled artisans, the strength and mechanical impact performance of a glass sheet or laminate can be limited by defects in the glass, including both surface and internal defects. When a glass laminate is impacted, the impact point is put into compression, while a ring or "hoop" around the impact point, as well as the opposite face of the impacted sheet, is put into tension. Typically, the origin of failure will be at a flaw, usually on the glass surface, at or near the point of highest tension. This may occur on the opposite face, but can occur within the ring. If a flaw in the glass is put into tension during an impact event, the flaw will likely propagate, and the glass will typically break. Thus, a high magnitude and depth of compressive stress (depth of layer) is preferable. The addition of controlled flaws to surface 3 and acid etch treatment of surfaces 2 and 4 provide such laminates with the desired breakage performance upon internal and external impact events.

Due to chemical strengthening, one or both of the external surfaces of the glass laminates disclosed herein are under compression. In order for flaws to propagate and failure to occur, the tensile stress from an impact must exceed the surface compressive stress at the tip of the flaw. In embodiments, the high compressive stress and high depth of layer of chemically-strengthened glass sheets enable the use of thinner glass than in the case of non-chemically-strengthened glass.

In an embodiment hereof, a glass laminate can comprise inner and outer glass sheets such as chemically-strengthened glass sheets wherein the outer-facing chemically-strengthened glass sheet has a surface compressive stress of at least 300 MPa, e.g., at least 400, 450, 500, 550, 600, 650, 700, 750 or 800 MPa, a depth of at least about 20 µm (e.g., at least about 20, 25, 30, 35, 40, 45, or 50 µm) and/or a central tension greater than 40 MPa (e.g., greater than 40, 45, or 50 MPa) and less than 100 MPa (e.g., less than 100, 95, 90, 85, 80, 75, 70, 65, 60, or 55 MPa) and the inner-facing glass sheet (e.g., an inner chemically-strengthened glass sheet) has a surface compressive stress of from one-third to one-half the surface compressive stress of the outer chemically-strengthened glass sheet, or equal that of the outer glass sheet. Flaws may optionally be formed in the outer surface 3 of the inner glass sheet.

In other embodiments hereof the outer glass sheet 11 maybe formed of a non-chemically strengthened glass sheet, such as a soda lime glass sheet, having a thickness of about 1.5 mm or greater, about 2 mm or greater or about 2.5 mm or greater and the inner glass sheet 13 may be a thin chemically strengthened glass sheet having a thickness, CS, DOL and flaws formed in its external third surface as previously described herein. The CS of the inner glass sheet in these embodiments may be about 700 MPa or greater. The non-chemically strengthened external glass sheets may optionally be heat strengthened or thermally tempered. Alternatively, the outer third surface of the inner glass sheet in these embodiments may be free of flaws and the CS may be about 300 MPa or greater.

In a further embodiments hereof, the the inner sheet 13 maybe formed of non-chemically strengthened glass sheet, such as a soda lime glass sheet, having a thickness of about 1.5 mm or greater, about 2 mm or greater, or about 2.5 mm or greater and the outer glass sheet 11 may be a thin chemically strengthened glass sheet having a thickness, CS and DOL as previously described herein. The CS of the inner glass sheet in these embodiments may be about 550 MPa. The non-chemically strengthened internal glass sheet may optionally be heat strengthened or thermally tempered and may optionally have flaws as previously described herein formed in its outer third surface.

In addition to their mechanical properties, the acoustic damping properties of the disclosed glass laminates have also been evaluated. As will be appreciated by a skilled artisan, laminated structures with an acoustic interlayer, such as a commercially available acoustic PVB interlayer, can be used to dampen acoustic waves. The chemically-strengthened glass laminates disclosed herein can dramatically reduce acoustic transmission while using thinner (and lighter) structures that also possess the requisite mechanical properties for many glazing applications.

As used herein, the singular forms "a," "an," and "the" include plural referents unless the context clearly dictates otherwise. Thus, for example, reference to a "metal" includes examples having two or more such "metals" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A glass laminate for a vehicle glazing, the glass laminate comprising:
    an outer glass sheet having an outer first surface and an inner second surface;
    an inner glass sheet having an outer third surface and an inner fourth surface; and
    a polymer interlayer between the second surface of the outer glass sheet and the third surface of the inner glass sheet,
    wherein the inner glass sheet is chemically strengthened with a depth of layer (DOL),
    wherein at least one of the inner glass sheet and the outer glass sheet has a thickness not exceeding about 2 mm or less, and
    wherein the outer third surface of the inner glass sheet has flaws formed therein to weaken the glass laminate in the event of an internal impact on the inner fourth surface, the flaws formed in the third surface having a depth of about 80% to 90% a depth of the depth of layer (DOL).

2. The glass laminate as in claim 1, wherein the outer glass sheet is chemically strengthened.

3. The glass laminate as in claim 1, wherein the inner glass sheet has a thickness not exceeding 2.0 mm, not exceeding 1.5 mm, not exceeding 1.0 mm or not exceeding 0.7 mm.

4. The glass laminate as in claim 3, wherein the outer glass sheet has a thickness not exceeding 2.0 mm, not exceeding 1.5 mm, not exceeding 1.0 mm or not exceeding 0.7 mm and is chemically strengthened.

5. The glass laminate as in claim 3, wherein the outer glass has a thickness of at least 1.5 mm and is not chemically strengthened.

6. The glass laminate as in claim 5, wherein the outer glass sheet is formed of soda lime glass.

7. The glass laminate as in claim 2, wherein the outer glass sheet has a thickness not exceeding 2.0 mm, not exceeding 1.5 mm, not exceeding 1.0 mm or not exceeding 0.7 mm.

8. The glass laminate as in claim 1, wherein at least one of the second surface and the fourth surface have been acid etched to strengthen the glass laminate in the event of an external impact on the first surface.

9. The glass laminate as in claim 8, wherein both the second surface and the fourth surface have been acid etched to strengthen the glass laminate in the event of an external impact on the first surface.

10. The glass laminate as in claim 1, wherein the flaws are formed in substantially the entire area of the third surface.

11. The glass laminate as in claim 1, wherein the flaws are formed in substantially the entire area of the third surface, except for an outer peripheral portion of the third surface.

12. The glass laminate as in claim 1, wherein the flaws are formed in at least one select region of the third surface.

13. The glass laminate as in claim 1, wherein the depth of layer (DOL) of the inner glass sheet is about 40 μm.

14. The glass laminate as in claim 1, wherein the inner glass sheet and the outer glass sheet are each chemically hardened to a surface compressive stress (CS) of at least 300 MPa.

15. The glass laminate as in claim 1, wherein the inner glass sheet and the outer glass sheet are each chemically hardened to a surface compressive stress (CS) of at least 500 MPa.

16. The glass laminate as in claim 1, wherein the inner glass sheet and the outer glass sheet are each chemically hardened to a surface compressive stress (CS) of at least 550 MPa.

17. The glass laminate as in claim 1, wherein the flaws formed in the third surface have a depth of about 45 μm.

18. The glass laminate as in claim 1, wherein the flaws formed below the third surface and at a depth of about 75 μm.

* * * * *